(12) United States Patent
Micks et al.

(10) Patent No.: US 11,169,534 B2
(45) Date of Patent: Nov. 9, 2021

(54) VEHICLE RADAR PERCEPTION AND LOCALIZATION

(71) Applicant: Ford Global Technologies, LLC., Dearborn, MI (US)

(72) Inventors: Ashley Elizabeth Micks, Mountain View, CA (US); Venkatapathi Raju Nallapa, Fairfield, CT (US); Vidya Nariyambut Murali, Sunnyvale, CA (US); Scott Vincent Myers, Camarillo, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 99 days.

(21) Appl. No.: 16/052,122

(22) Filed: Aug. 1, 2018

(65) Prior Publication Data

US 2018/0341273 A1 Nov. 29, 2018

Related U.S. Application Data

(63) Continuation of application No. 14/856,010, filed on Sep. 16, 2015, now Pat. No. 10,082,797.

(51) Int. Cl.
*G05D 1/02* (2020.01)
*G01C 21/30* (2006.01)
(Continued)

(52) U.S. Cl.
CPC .......... *G05D 1/0257* (2013.01); *B60W 30/00* (2013.01); *G01C 21/30* (2013.01); *G01S 13/865* (2013.01); *G01S 19/45* (2013.01); *G05D 1/0274* (2013.01); *G01S 5/0284* (2013.01); *G05D 1/024* (2013.01); *G05D 1/0278* (2013.01); *G05D 2201/0213* (2013.01)

(58) Field of Classification Search
CPC ........ G01S 5/00; G01S 5/0252; G01S 5/0257; G01S 5/0263; G01S 2007/52009
See application file for complete search history.

(56) References Cited

U.S. PATENT DOCUMENTS 7,979,173 B2 6/2011 Breed
8,948,955 B2 2/2015 Zhu
(Continued)

OTHER PUBLICATIONS

Kent, HERE introduces HD maps for highly automated vehicle testing, Jul. 20, 2015, HERE360 (Year: 2015).*

*Primary Examiner* — Thomas G Black
*Assistant Examiner* — Sara J Lewandroski
(74) *Attorney, Agent, or Firm* — David R. Stevens; Stevens Law Group (57) ABSTRACT

The disclosure relates to methods, systems, and apparatuses for autonomous driving vehicles or driving assistance systems and more particularly relates to vehicle radar perception and location. The vehicle driving system disclosed may include a storage media, a radar system, a location component and a driver controller. The storage media stores a map of roadways. The radar system is configured to generate perception information from a region near the vehicle. The location component is configured to determine a location of the vehicle on the map based on the radar perception information and other navigation related data. The drive controller is configured to control driving of the vehicle based on the map and the determined location.

20 Claims, 4 Drawing Sheets

(51) Int. Cl.
  *B60W 30/00*  (2006.01)
  *G01S 19/45*  (2010.01)
  *G01S 13/86*  (2006.01)
  *G01S 5/02*  (2010.01)

(56) References Cited

U.S. PATENT DOCUMENTS

| | | | |
|---|---|---|---|
| 9,719,801 B1* | 8/2017 | Ferguson | G01S 17/931 |
| 2010/0241354 A1* | 9/2010 | Stahlin | H04L 67/12 |
| | | | 701/532 |
| 2011/0046873 A1* | 2/2011 | Nagase | G08G 1/08 |
| | | | 701/532 |
| 2011/0054716 A1* | 3/2011 | Stahlin | H04W 4/024 |
| | | | 701/1 |
| 2011/0071756 A1* | 3/2011 | Stahlin | G01C 21/32 |
| | | | 701/532 |
| 2011/0106444 A1* | 5/2011 | Adachi | G08G 1/096758 |
| | | | 701/532 |
| 2012/0150392 A1* | 6/2012 | Stahlin | H04L 67/12 |
| | | | 701/45 |
| 2013/0024104 A1* | 1/2013 | Stahlin | G01C 21/28 |
| | | | 701/409 |
| 2013/0181823 A1 | 7/2013 | Stahlin | |
| 2013/0194126 A1 | 8/2013 | Paoletti | |
| 2013/0245941 A1* | 9/2013 | Stahlin | G01C 21/26 |
| | | | 701/532 |
| 2013/0265189 A1* | 10/2013 | Chang | G01S 13/87 |
| | | | 342/52 |
| 2014/0081507 A1 | 3/2014 | Urmson | |
| 2014/0214255 A1 | 7/2014 | Dolgov | |
| 2014/0358322 A1* | 12/2014 | Ibrahim | G01C 21/30 |
| | | | 701/1 |
| 2015/0025708 A1* | 1/2015 | Anderson | A61B 5/02055 |
| | | | 701/2 |
| 2016/0061614 A1* | 3/2016 | Lee | G01C 21/30 |
| | | | 701/446 |
| 2016/0116289 A1* | 4/2016 | Friend | G01S 5/0247 |
| | | | 701/469 |
| 2016/0288785 A1* | 10/2016 | Ezoe | B60W 30/18145 |
| 2017/0023659 A1* | 1/2017 | Bruemmer | G01S 19/48 |
| 2017/0167883 A1* | 6/2017 | Pink | G01C 21/30 |
| 2017/0243485 A1* | 8/2017 | Rubin | H04W 4/026 |

* cited by examiner

VEHICLE RADAR PERCEPTION AND LOCALIZATION

CROSS REFERENCE TO RELATED PATENT APPLICATION

The present application is a continuation of U.S. patent application Ser. No. 14/856,010, filed on Sep. 16, 2015, which is incorporated by reference in its entirety.

TECHNICAL FIELD

The disclosure relates generally to methods, systems, and apparatuses for autonomous driving vehicles or driving assistance systems and more particularly relates to vehicle radar perception and location.

BACKGROUND

Autonomous vehicles and driving assistance systems are currently being developed and deployed to provide safety, reduce an amount of user input required, or even eliminate user involvement entirely. For example, some driving assistance systems, such as crash avoidance systems, may monitor driving, positions, and velocities of the vehicle and other objects while a human is driving. When the system detects that a crash or impact is imminent the crash avoidance system may intervene and apply a brake, steer the vehicle, or perform other avoidance or safety maneuvers. As another example, autonomous vehicles may drive and navigate a vehicle with little or no user input. However, due to the dangers involved in driving and the costs of vehicles, it is extremely important that autonomous vehicles and driving assistance systems operate safely and are able to accurately navigate roads, avoid objects, and observe their surroundings. Furthermore, current autonomous vehicles and driving assistance systems may struggle to operate safely or correctly due to the wide variety of terrain, weather conditions, and other environments in which vehicles often operate. Thus, autonomous vehicles must operate safely under adverse conditions and perceive the environment as accurately as possible, even if some of the vehicle's sensors fail.

BRIEF DESCRIPTION OF THE DRAWINGS

Non-limiting and non-exhaustive implementations of the present disclosure are described with reference to the following figures, wherein like reference numerals refer to like parts throughout the various views unless otherwise specified. Advantages of the present disclosure will become better understood with regard to the following description and accompanying drawings where.

DETAILED DESCRIPTION

Under driving conditions such as a snow-covered roads without buildings or other landmarks, cameras and light detection and ranging (LIDAR) systems have difficulty due to the low visual contrast and high reflectivity of the environment. Weather conditions, including dense fog and rain, can severely limit camera and LIDAR data acquisition. Additionally, the reflectivity of widespread water on the ground can be challenging for both LIDAR and visual systems. Under these circumstances, applicants have recognized that the most reliable data available includes data from radio detection and ranging (radar), positioning systems such as a global positioning systems (GPS), digital maps such as high definition (HD) maps, drive history, and vehicle-to-vehicle (V2V) and vehicle to infrastructure (V2X) communication.

Even if a driver assist feature or autonomous driving solutions makes use of various combinations of sensors (such as LIDAR), camera(s), and maps in the vehicle's memory, these features or solutions may be unable to provide useful information due to environmental conditions or damage. Radar will frequently be able to provide useful information even in these conditions. Thus, some embodiments herein combine any available radar data with as much other information that the vehicle can obtain about its environment as possible, including not only HD maps, but also drive history and V2X communication, for example.

The present disclosure discusses systems, methods, and devices for integrating data from radar sensors on a vehicle with data from other sources of information such as GPS, HD maps, and drive history information, to more completely and accurately localize a vehicle on a road and perceive relevant parts of the environment, such as obstacles. Information from vehicle-to-vehicle or vehicle-to-infrastructure (V2X) communication may also be taken into account by these perception and localization algorithms. Some embodiments include performing perception and localization for use with autonomous navigation and active safety or driver assist features. In one embodiment, information from previous drives is stored in the vehicle's memory, including route geometry and behavioral features from previous trips along the same path. In one embodiment, HD maps in the vehicle's memory detail information about the positions of roads, lane markings, traffic signs, or other locations in terms of GPS coordinates. In one embodiment, other vehicles and the road infrastructure wirelessly share information from their own sensors to supplement the vehicle's on board perception. In one embodiment, information from the vehicle's on-board GPS, in combination with readings from its radar sensors and any information gained via V2V or V2X communication, is used to determine a location of the vehicle (localize the vehicle) on the HD map and relative to any drive history data. In one embodiment, the vehicle may navigate or maneuver autonomously based on the determined location(s), provided sufficient confidence in its perception of its surroundings can be achieved. A potential advantage of using a radar system to provide perception information for a vehicle is that useful data can be acquired in even very adverse weather conditions.

In the following disclosure, reference is made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed in greater detail below. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the following description and Claims to refer to particular system components. As one skilled in the art will appreciate, components may be referred to by different names. This document does not intend to distinguish between components that differ in name, but not function.

Figure 1:
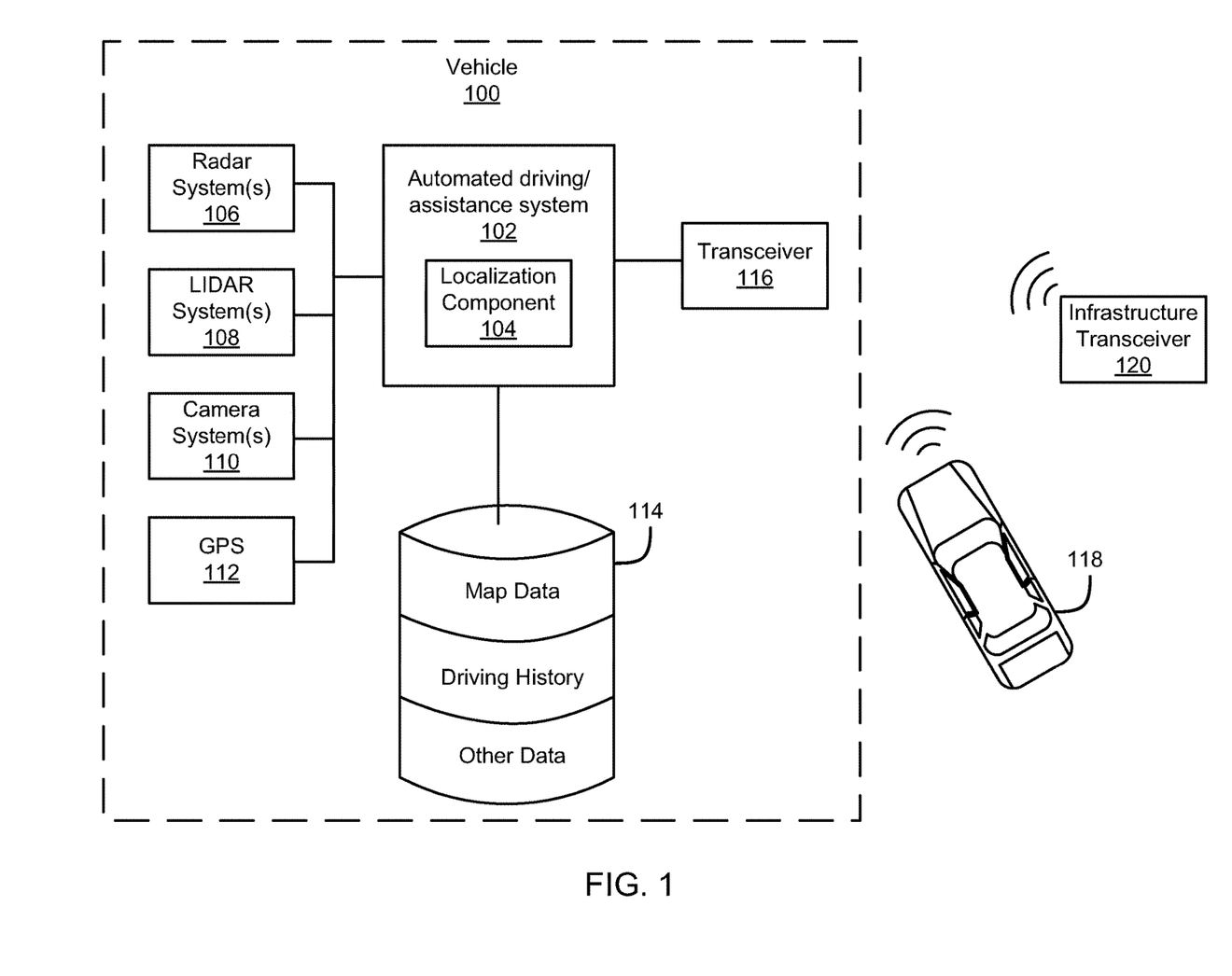
FIG. 1 is a schematic block diagram illustrating an implementation of a vehicle that includes an automated driving/assistance system.

Referring now to the figures, FIG. 1 illustrates a vehicle 100 that includes an automated driving/assistance system 102. The automated driving/assistance system 102 may be used to automate or control operation of the vehicle 100. For example, the automated driving/assistance system 102 may control one or more of braking, steering, acceleration, lights, alerts, driver notifications, radio, or any other auxiliary systems of the vehicle 100. The automated driving/assistance system 102 may include a plurality of systems and devices including actuators, such as electric motors, to control braking, steering or the like. The automated driving/assistance system 102 includes a localization component 104, which is used to determine a location of the vehicle 100 based on any data or sensors that are available at the time. The vehicle 100 also includes one or more radar systems 106, one or more LIDAR systems 108, one or more camera systems 110, a GPS 112, a data store 114, and a transceiver 116. It will be appreciated that the embodiment of FIG. 1 is given by way of example only. Other embodiments may include fewer or additional components without departing from the scope of the disclosure. Additionally, illustrated components may be combined or included within other components without limitation. For example, the localization component 104 may be separate from the automated driving/assistance system 102 and the data store 114 may be included as part of the automated driving/assistance system 102 and/or part of the localization system 104.

A radar system 106 may include any radar system well known in the art. Radar system operations and performance is generally well understood. In general, a radar system 106 operates by transmitting radio signals and detecting reflections off objects. In ground applications, the radar may be used to detect physical objects, such as other vehicles, landscapes (such as trees, cliffs, rocks, hills, or the like), road edges, signs, buildings, or other objects. The radar system 106 may use the reflected radio waves to determine a size, shape, distance, surface texture, or other information about a physical object or material. For example, the radar system 106 may sweep an area to obtain data or objects within a specific range and viewing angle of the radar system 106. In one embodiment, the radar system 106 is configured to generate perception information from a region near the vehicle, such as one or more regions nearby or surrounding the vehicle 100. For example, the radar system 106 may obtain data about regions of the ground or vertical area immediately neighboring or near the vehicle 100. The radar system 106 may include one of many widely available commercially available radar systems. In one embodiment, the radar system 106 may provide perception data including a two dimensional or three-dimensional map or model to the automated driving/assistance system 102 for reference or processing. As will be appreciated by one skilled in the art in light of the present disclosure, some radar systems 106, which are commercially available, can operate in some of the most severe and adverse weather conditions with little or no degradation in the quality or accuracy of perception data. For example, wet surfaces, snow, and fog may have very little impact on an ability of the radar system 106 to accurately locate and detect ranges to objects.

A LIDAR system 108 may include any LIDAR system well known in the art. Principles of operation and performance of LIDAR systems are generally well understood. In general, the LIDAR system 108 operates by emitting visible wavelength or infrared wavelength lasers and detecting reflections of the light off objects. In ground applications, the lasers may be used to detect physical objects, such as other vehicles, landscapes (such as trees, cliffs, rocks, hills, or the like), road edges, signs, buildings, or other objects. The LIDAR system 108 may use the reflected laser light to determine a size, shape, distance, surface texture, or other information about a physical object or material. For example, the LIDAR system 108 may sweep an area to obtain data or objects within a specific range and viewing angle of the LIDAR system 108. For example, the LIDAR system 108 may obtain data about regions of the ground or vertical area immediately neighboring or near the vehicle 100. The LIDAR system 108 may include one of many widely available commercially available LIDAR systems. In one embodiment, the LIDAR system 108 may provide perception data including a two dimensional or three-dimensional model or map of detect objects or surfaces.

Although LIDAR may be used to obtain highly accurate and highly detailed information about surrounding objects and surfaces, the quality of data obtain by LIDAR systems 108 may degrade significantly in wet situations. For example, many road surfaces will reflect a significant portion of laser light back toward a LIDAR system 108 when dry. However, if the surface becomes wet, the laser may be reflected, but may continue to travel away from the LIDAR system 108. Thus, in high rain or puddling situations, LIDAR data may degrade significantly and make it extremely difficult or impossible to accurately determine locations of roads, vehicle, or other vehicles with sufficient certainty. LIDAR system data may also degrade significantly in high rain or snow situations because the laser light may be reflected by snowflakes or rain drops. Thus, the returned data may have a significant amount of "noise" that may obscure objects of interest such as vehicles, trees, curbs, the roadway, people, or the like. In these situations, radar may be far superior and dependable.

A camera system 110 may include one or more cameras, such as visible wavelength cameras or infrared cameras. The camera system 110 may provide a video feed or periodic images, which can be processed for object detection, road identification and positioning, or other detection or positioning. In one embodiment, the camera system 110 may include two or more cameras, which may be used to provide ranging (e.g., detect a distance) for objects within view of the two or more cameras.

Although, cameras can provide very good and detailed data for an automated driving/assistance system 102, the quality of data can degrade significantly in the dark or in the presence of certain weather related conditions, including fog, rain, or snow. This is especially true for automated driving/assistance systems 102, which process a video or image feed to assist driving as any "noise" or obstruction caused by the weather related conditions, including fog, rain, or snow can make it very difficult for automated algorithms to identify or detect objects or determine distances.

The GPS system 112 is one embodiment of a positioning system that may provide a geographical location of the vehicle 100 based on satellite or radio tower signals. GPS systems 112 are well-known and widely available in the art. Although GPS systems 112 can provide very accurate positioning information, GPS systems 112 generally provide little or no information about distances between the vehicle and other objects. Rather, they simply provide a location, which can then be compared with other data, such as maps, to determine distances to other objects, roads, or locations of interest. Although GPS systems 112 can experience degradation due to adverse weather conditions, high quality or accuracy GPS data may still be obtained in some situations where camera data or LIDAR data is unavailable or below a desired quality.

The data store 114 stores map data, a driving history, and other data, which may include other navigational data, settings, or operating instructions for the automated driving/assistance system 102. The map data may include location data, such as GPS location data, for roads. For example, the location data for roads may include location data for specific lanes, such as lane direction, merging lanes, highway or freeway lanes, exit lanes, or any other lane or division of a road. The location data for roads may also include data regarding the edges of the roads, details about lane type (e.g., commuter lane, passing lane), details about lane direction, or any other details. In one embodiment, the map data includes location data about one or more structures or objects on or near the roads. For example, the map data may include data regarding GPS sign location, bridge location, building or other structure location, or the like. In one embodiment, the map data may include precise location data with accuracy within a few meters or within sub meter accuracy. The map data may also include location data for paths, dirt roads, or other roads or paths, which may be driven by a land vehicle.

The driving history may include location data for past trips taken by the vehicle 100. For example, the driving history may include GPS location data for the previous trips or paths taken. As another example, the driving history may include distance or relative location data with respect to lane lines, signs, road border lines, or other objects or features on or near the roads. The distance or relative location data may be determined based on GPS data, radar data, LIDAR data, camera data, or other sensor data gathered during the previous or past trips taken by the vehicle 100. This driving history data may be logged by the automated driving/assistance system 102 for future use if/when sensor data fails. For example, by saving detailed lane location, sign location, or other data, the automated driving/assistance system 102 may be able to determine an extremely precise location based on radar data only (or a combination of radar and any other available location/navigation data). In one embodiment, the automated driving/assistance system 102 is configured to log driving data to the data store 114 for and during any trips or drives taken by the vehicle 100.

The transceiver 116 is configured to receive signals from one or more other data or signal sources. The transceiver 116 may include one or more radios configured to communicate according to a variety of communication standards and/or using a variety of different frequencies. For example, the transceiver 116 may receive signals from other vehicles, such as vehicle 118. Receiving signals from another vehicle is reference herein as vehicle-to-vehicle (V2V) communication. In one embodiment, the transceiver 116 may also be used to transmit information to other vehicles, such as vehicle 118, to potentially assist them in locating the vehicle 100, other vehicles or objects. During V2V communication the transceiver 116 may receive information from other vehicles about their locations, other traffic, accidents, road conditions, or any other details that may assist the vehicle 100 and/or automated driving/assistance system 102 in driving accurately or safely.

The transceiver 116 may receive signals from other signal sources that are at fixed locations. Infrastructure transceiver 120 may be located at a specific geographic location and may transmit its specific geographic location with a time stamp. Thus, the automated driving/assistance system 102 may be able to determine a distance from the infrastructure transceiver 120 based on the time stamp and then determine its location based on the location of the infrastructure transceiver 120. For example, the transceiver 116 may receive signals from infrastructure transceivers 120 that are built into road or transportation infrastructure. In one embodiment, roads may include transmitters placed along roads that may be used by the vehicle 100 to obtain precise locations with respect to the roads or other geographic locations. Similarly, magnets or other location mechanisms may also be placed along or in the roads, which may be sensed by the transceiver 116 or other devices. In one embodiment, the transceiver 116 may receive signals from radio or cell phone towers. For example, the transceiver 116 may include a radio that is able to receive and process location data on licensed spectrums even if it is not capable of communicating information or decoding voice or other types of data communications. For example, many mobile networks provide location services, which may be used by the automated driving/assistance system 102. In one embodiment, receiving or sending location data from devices or towers at fixed locations is referenced herein as vehicle-to-infrastructure (V2X) communication. In one embodiment, the term V2X communication may also encompass V2V communication.

In one embodiment, the transceiver 116 may send and receive location data via a mobile network or cell connection. For example, the transceiver 116 may receive updated location data for a specific area as the vehicle 100 travels along a road way. Similarly, the transceiver 116 may receive historical driving data for the vehicle 100 or other vehicles that have driven along a road in that location. For example, the transceiver 116 may receive data that indicates locations of signs or objects which may be detectable using a radar system 106. If the transceiver 116 is able to receive signals from three or more infrastructure transceivers 120, the automated driving/assistance system 102 may be able to triangulate its geographic location.

Figure 2:
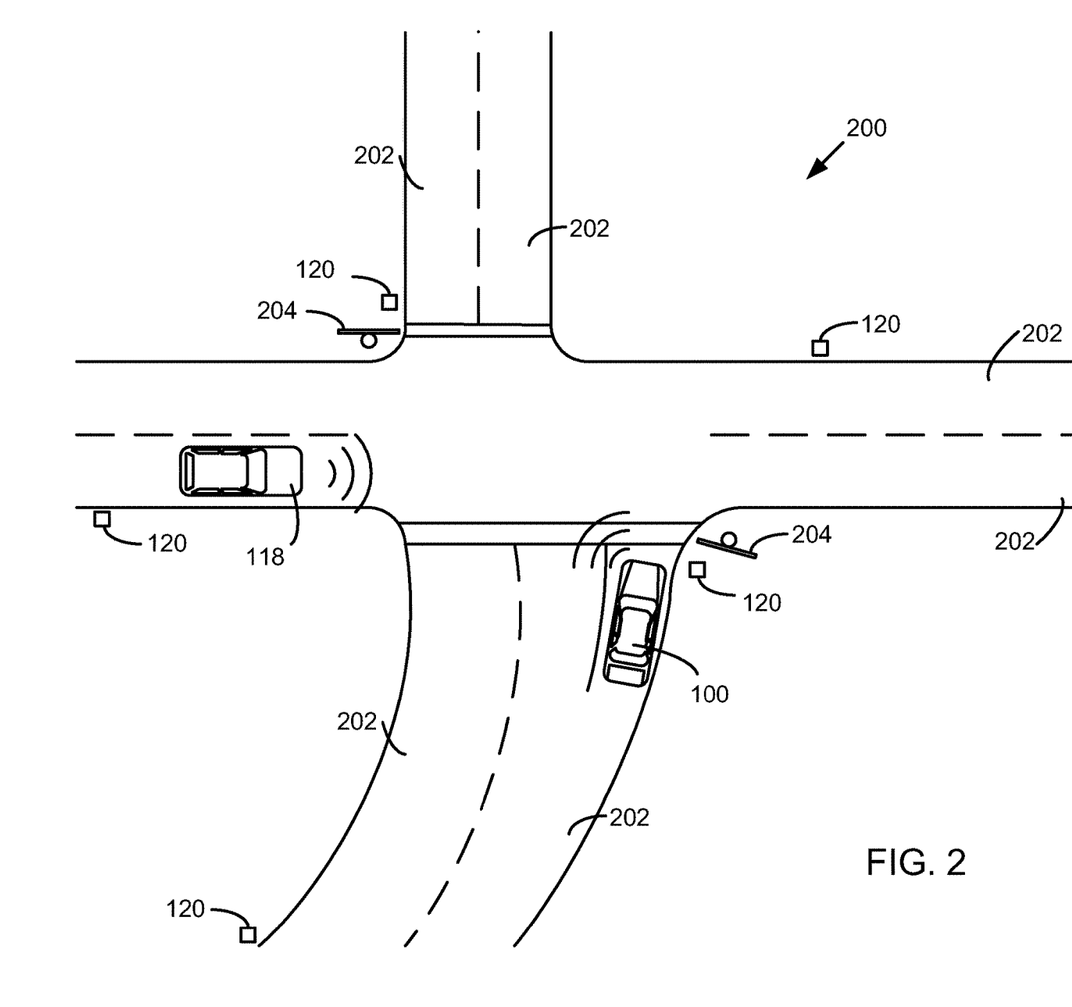
FIG. 2 is a schematic top view diagram illustrating a roadway, according to one embodiment.

Referring now to FIG. 2, there is illustrated a schematic top view diagram of a roadway 200. The roadway 200 includes a plurality of lanes 202 marked by lines with vehicles 100 and 118 driving on the roadway 200. At an intersection of the roadway 200 are traffic signs 204. Near or on the roadway are a plurality of infrastructure transmitters or transceivers 120. The vehicle 100 may be able to determine an accurate location on the roadway based on radar detection of the signs 204, transceiver detection of the infrastructure transmitters or transceivers 120 and signals transmitted by the vehicle 118, and/or any data stored in the data store 114. Thus, even if inclement weather is affecting data quality of information transmitted from camera systems 110 or LIDAR systems 108, the automated driving/assistance system 102 may be able to accurately determine the vehicle's 100 location based on the radar system 106 and any other available navigation related data.

Figure 3:
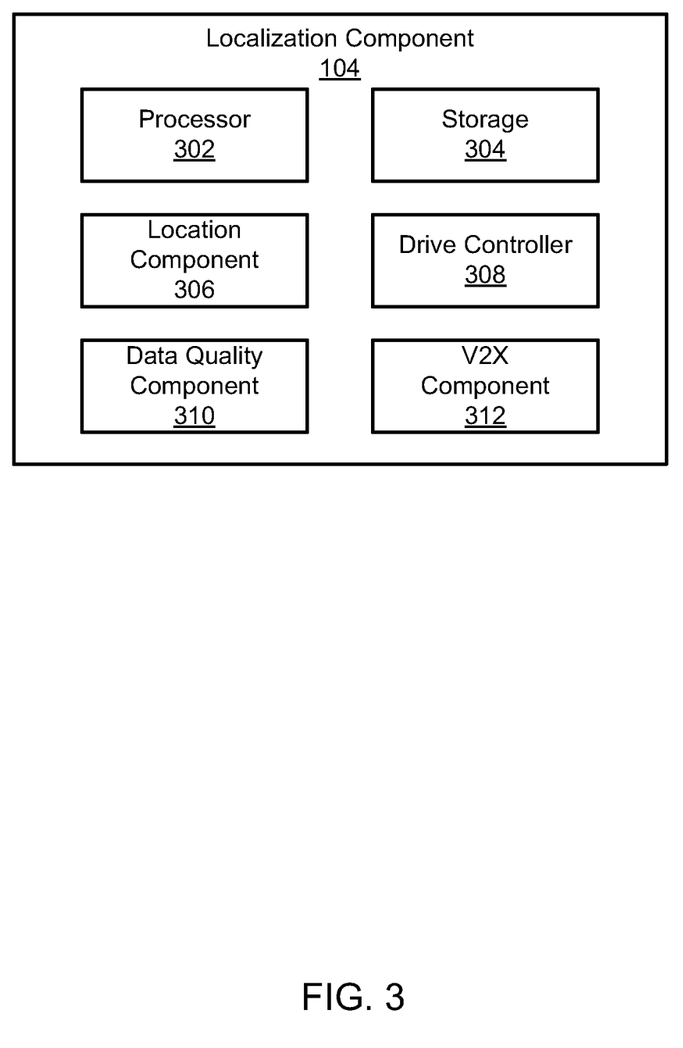
FIG. 3 is a schematic block diagram illustrating example components of a localization component, according to one implementation.

FIG. 3 is a block diagram illustrating example components of the localization component 104. In the depicted embodiment, the localization component 104 includes a processor 302, storage 304, a location component 306, a drive controller 308, a data quality component 310, and a V2X component 312. The components 302-312 are given by way of illustration only and may not all be included in all embodiments. In fact some embodiments may include only one or any combination of two or more of the components 302-312.

The processor 302 may include any type of general purpose or special purpose processor for executing program code or instructions. For example, the processor 302 may be used to execute instructions corresponding to one or more of the other components 304-312. The storage 304 may include a computer readable medium that stores instructions corresponding to the other components 306-312. For example, the storage 304 may store the other components 306-312 as components of a computer program. The storage 304 may correspond to the data store 114 of FIG. 1. In one embodiment, the storage 304 is configured to store data, such as map data, program code, driving history, or other data. The map data may include a map of one or more roadways or driving paths. In one embodiment, the map includes information about locations of the object or structure in relation to the road or the driving path.

The location component 306 is configured to determine a location of a corresponding vehicle (such as the vehicle 100 of FIG. 1) on a map based on radar perception information and other navigation related data, if any. In one embodiment, the location component receives the perception information from a radar system 106 for one or more of a ground surface and objects in a region near the vehicle 100. In one embodiment, the other navigation related data comprises location information determined by a positioning system. In one embodiment, the location component 306 determines the location of the vehicle 100 based on the radar perception information and data from a satellite positioning system. In one embodiment, the location component 306 determines the location of the of the vehicle 100 based on the information from the satellite positioning system and based on a location of an object or structure detected by the perception information from the radar system 106, wherein the object or structure is identified in the map. For example, the map may indicate a location of the object or structure and the location component 306 may determine where the distance from the object or structure intersects within an error region of GPS data.

In one embodiment, the other navigation related data includes location information determined based on a V2V communication and/or a V2X communication. For example, the location component 306 may receive location or perception information from an infrastructure system, such as from infrastructure transceiver 120, or another vehicle, such as vehicle 118, and determine the location of the vehicle 100 based on the location or perception information from the infrastructure system or the other vehicle. In one embodiment, the other navigation related data includes trip data from one or more previous trips taken by the vehicle 100. In one embodiment, the location component 304 may determine a location of the vehicle 100 or another object based on radar data and any combination of LIDAR data, camera image data, V2V data, V2X data, map data, or any other data discussed herein.

In one embodiment, the location component 304 receives the perception information from the radar system 106, the LIDAR system 108, the camera system 110, the GPS 112 or from the infrastructure system, such as from infrastructure transceiver 120, or another vehicle, such as vehicle 118, or from other sensors. The radar data and data from various sensors may be combined and/or processed to determine the current location of the vehicle 100 by making use of radar detections, which may be high density or other radar detections, in localization methods analogous to the use of LIDAR point clouds for localization. The live radar detections may be compared to maps and other data available in the memory of the vehicle 100 to determine the current location of the vehicle 100. In one embodiment, the radar data and data from various sensors may be combined and/or processed to determine the current location of the vehicle 100 by tracking radar detections over time and comparing those detections to GPS data over time, so that GPS drift can be corrected during the drive.

The drive controller component 308 is to control driving of the vehicle 100 based on the map and the determined location. In one embodiment, the drive controller component 308 may determine a driving maneuver to be performed by the vehicle 100 and provide control signals to one or more actuators or systems to control steering, braking, or any other system of the vehicle 100. In one embodiment, the drive controller component 308 may control driving of the vehicle 100 by causing the vehicle 100 to perform a driving maneuver based on the determined location on the map. In one embodiment, the drive controller component 308 may control driving of the vehicle 100 by providing the position of the vehicle 100 to an autonomous driving system, such as automated driving/assistance system 102, of the vehicle 100, which may then perform driving maneuvers or driving based on the position.

The data quality component 310 is configured to determine that one or more sensor units are not providing usable data or are damaged. For example, the data quality component 310 may determine that the LIDAR system 108, camera system 110, or other sensor or data input is not providing usable data. For example, the data quality component 310 may determine that a sensor is damaged or may determine that data quality has dropped below a threshold. In one embodiment, the data quality component 310 may determine that LIDAR data or camera data is not usable based on an amount of noise in the data or based on low light or low laser reflection. In one embodiment, the data quality component 310 may determine that one or more sensors are not operating based on a signal from the one or more sensors explicitly indicating that the sensors are not functioning. In one embodiment, the data quality component 310 is configured to determine that the one or more sensor units are not providing usable data or are damaged based on one or more of current weather conditions and determining the one or more sensor units are not providing any data. In one embodiment, the data quality component 310 may receive data via a mobile network or Internet connection that weather conditions are bad for camera or LIDAR data.

The V2X component 312 is configured to receive V2V or V2X communications. In one embodiment, the V2X component 312 provides the V2V or V2X communications to the location component 306 or the storage 304. For example, the location component 306 may determine a location of a vehicle based on the V2V and/or V2X communications.

Figure 4:
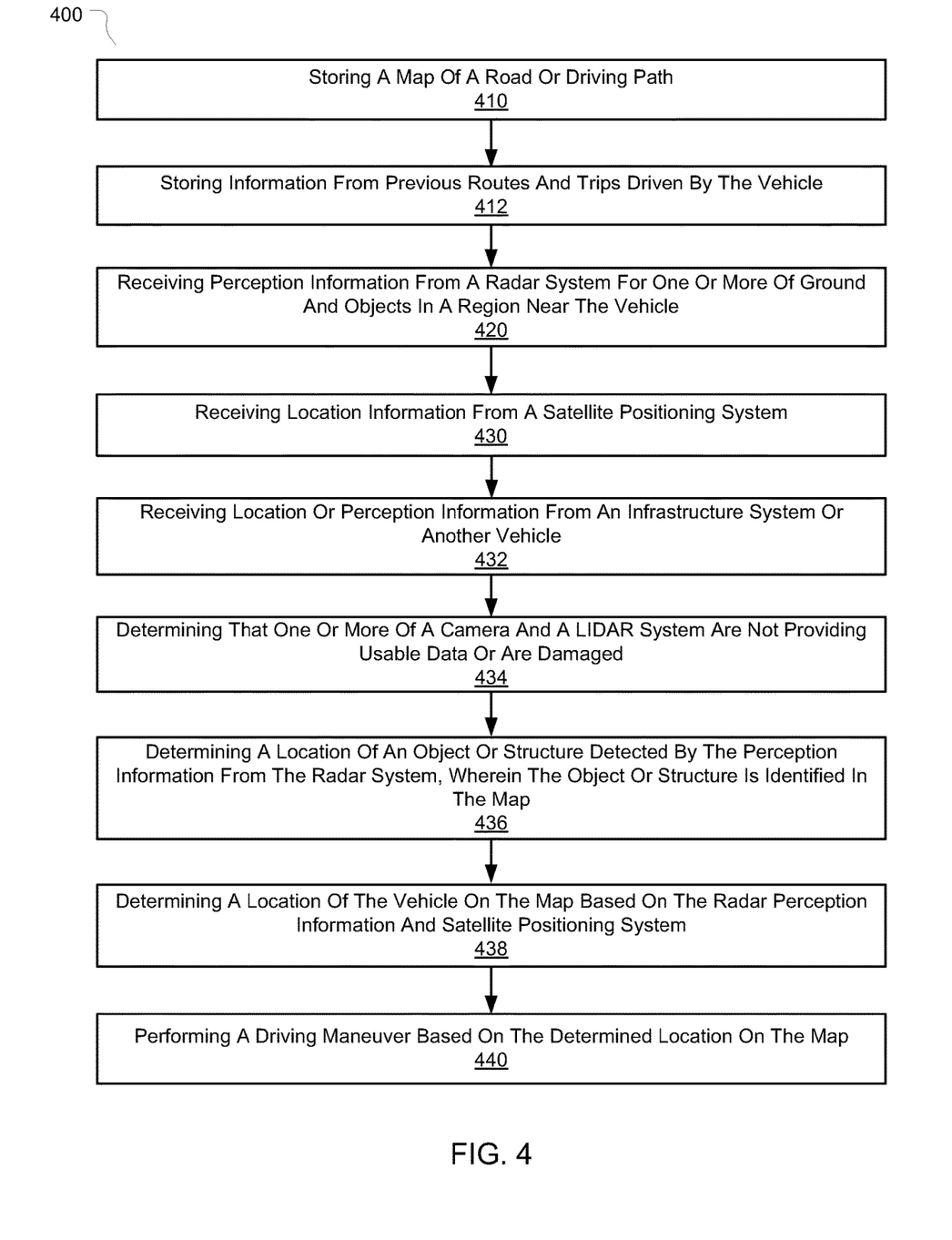
FIG. 4 is a schematic flow chart diagram illustrating a method for perception and localization for a road vehicle, according to one implementation.

Referring now to FIG. 4, there is illustrated a schematic flow chart diagram of a method 400 for perception and localization for a road vehicle or for an automated driving or automated assistance system of a vehicle. The method 400 may be performed by an automated driving/assistance system or a localization component, such as the automated driving/assistance system 102 of FIG. 1 or the localization component 104 of FIG. 3.

The method 400 begins by storing a map of a road or driving path that a vehicle, such as vehicle 100, may travel at 410 in storage 304. It will be appreciated that the storage 304 may also store information from previous routes and trips driven by the vehicle at 412. The localization component 104 receives perception information from a radar system for one or more of ground and objects in a region near the vehicle at 420. The localization component 104 may also receive location information from a satellite positioning system at 430. The localization component 104 may also receive location or perception information from an infrastructure system or another vehicle at 432. A data quality component 310 determines that one or more of a camera and a LIDAR system are not providing usable data or are damaged at 434. A location component 306 determines a location of an object or structure detected by the perception information from the radar system, wherein the object or structure is identified in the map at 436. The location component 306 determines a location of the vehicle on the map based on the radar perception information and a satellite positioning system at 438. A drive controller component 308 performs or causes a vehicle to perform a driving maneuver based on the determined location on the map at 440.

EXAMPLES

The following examples pertain to further embodiments.

Example 1 is a vehicle driving system that includes: storage media for storing a map of roadways; a radar system configured to generate perception information from a region near the vehicle; a location component configured to determine a location of the vehicle on the map based on the radar perception information and other navigation related data; and a drive controller configured to control driving of the vehicle based on the map and the determined location.

In Example 2, the vehicle driving system of Example 1 further includes one or more additional sensor units and a data quality component configured to determine that one or more sensor units are not providing usable data or are damaged. The location component is configured to determine the location of the vehicle based on the radar perception information in response to determining that the one or more sensor units are not providing usable data or are damaged.

In Example 3, the data quality component of Example 2 is configured to determine that the one or more sensor units are not providing usable data or are damaged based on one or more of: current weather conditions or a determination that the one or more sensor units are not providing any data.

In Example 4, the one or more additional sensor units in any of Examples 2-3 include one or more of a camera and a LIDAR system, wherein the data quality component is configured to determine that one or more of the camera and the LIDAR system are not providing usable data or are damaged.

In Example 5, the other navigation related data in any of Examples 1-4 includes one or more of location information determined by a positioning system, location information determined based on a vehicle-to-vehicle communication, location information determined based on a vehicle-to-infrastructure communication, and trip data from one or more previous trips taken by the vehicle.

Example 6 is a method of perception and localization for a road vehicle. The method includes: storing a map of a road or driving path; receiving perception information from a radar system for one or more of ground and objects in a region near the vehicle; receiving location information from a satellite positioning system; determining a location of the vehicle on the map based on the radar perception information and the satellite positioning system; and performing a driving maneuver based on the determined location on the map.

In Example 7, the method of Example 6 further includes storing information from previous routes and trips driven by the vehicle and wherein determining the location further comprises determining the location based on the information from previous routes and trips driven by the vehicle.

In Example 8, determining the location of the of the vehicle on the map in any of Examples 6-7 includes determining based on the information from the satellite positioning system and based on a location of an object or structure detected by the perception information from the radar system, wherein the object or structure is identified in the map.

In Example 9, storing the map in any of Examples 6-8 includes storing a map comprising information about locations of the object or structure in relation to the road or the driving path.

In Example 10, the method of any of Examples 6-9 further includes receiving location or perception information from an infrastructure system or another vehicle, wherein determining the location further includes determining based on the location or perception information from the infrastructure system or the another vehicle.

Example 11 is the method of any of Examples 6-10 wherein: the road vehicle further comprises one or more of a camera and a LIDAR system; the method further comprises determining that one or more of the camera and the LIDAR system are not providing usable data or are damaged; and determining the location of the vehicle based on the perception information from a radar system is performed in response to determining that the camera or LIDAR system are not providing usable data or are damaged.

Example 12 is computer readable storage media storing instructions that, when executed by a processor, cause the processor to: obtain map data from storage, the map data corresponding to a map of a road; obtain navigation related data from one or more sources; obtain radar system data for a region near a vehicle; process the radar system data and the navigation related data to locate a position of a vehicle in relation to the road; and provide the position of the vehicle to an autonomous driving system of the vehicle.

In Example 13, the navigation related data in Example 12 includes one or more of: satellite positioning data from a satellite positioning system; information received via a vehicle-to-vehicle communication; information received via a vehicle-to-infrastructure communication; and information from previous routes and trips driven by the vehicle.

In Example 14, the map data in any of Examples 12-13 includes information about locations of an object or structure in relation to the road.

In Example 15, the radar system data in any of Examples 12-14 includes information about a location of the object or structure in relation to the vehicle, and wherein processing the radar system data to locate the position comprises determining the location based on the locations of the object or structure according to the map.

In Example 16, the vehicle in any of Examples 12-15 includes one or more of a camera and a LIDAR system and wherein the instructions further cause the processor to determine that one or more of the camera and the LIDAR system are not providing usable data or are damaged.

In Example 17, the instructions in any of Examples 12-16 cause the processor to process the radar system data and the navigation related data to locate the position in response to determining that the camera or LIDAR system are not providing usable data or are damaged.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

Embodiments of the disclosure have been directed to computer program products comprising such logic (e.g., in the form of software) stored on any computer usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:

1. A method comprising:
   retrieving drive history data for a vehicle from a high definition map comprising location information for roads, lane markings, and traffic signs in terms of global positioning system (GPS) coordinates, and further comprises behavioral features from previous trips travelled by the vehicle;

receiving supplemental data via one or more of a vehicle-to-vehicle communication or a vehicle-to-infrastructure communication;

determining that light detection and ranging (LIDAR) sensor data received from a LIDAR system of the vehicle has dropped below a threshold quality based on weather conditions; and in response to the LIDAR sensor data dropping below the threshold quality, localizing the vehicle relative to the high definition map based on the drive history data, GPS data received from a GPS system of the vehicle, radar sensor data received from a radar perception sensor of the vehicle, and the supplemental data.

2. The method of claim 1, further comprising receiving sensor data from a plurality of vehicle sensors comprising one or more of the GPS system of the vehicle, the LIDAR system of the vehicle, the radar perception sensor of the vehicle, or a camera.

3. The method of claim 1, further comprising determining whether the LIDAR system is providing usable data or is damaged based on one or more of:
the current weather conditions, including one or more of precipitation on roadways, low visual contrast, high reflectivity, fog, or precipitation; or
determining the LIDAR system is not providing any data.

4. The method of claim 3, further comprising:
in response to determining the LIDAR system is not providing usable data or is damaged, localizing the vehicle relative to the high definition map based on the GPS data, the radar sensor data, and the supplemental data; and
localizing the vehicle relative to the high definition map based at least in part on the LIDAR sensor data when the LIDAR system is providing usable data.

5. The method of claim 1, wherein the supplemental data comprises:
satellite positioning data from a satellite positioning system;
the information received via the vehicle-to-vehicle communication;
the information received via the vehicle-to-infrastructure communication; and
information received from previous routes and trips driven by the vehicle.

6. The method of claim 1, wherein the drive history data stored in the high definition map comprises the location information for previous trips driven by the vehicle and previous trips driven by other vehicles.

7. The method of claim 1, further comprising controlling driving of the vehicle based on the drive history data and the determined location of the vehicle relative to the high definition map.

8. The method of claim 1, wherein localizing the vehicle relative to the high definition map comprises localizing the vehicle based on each of the drive history data, the GPS data, the radar sensor data, and the supplemental data.

9. The method of claim 1, further comprising wirelessly receiving the vehicle-to-vehicle communication from one or more other vehicles and wirelessly receiving the vehicle-to-infrastructure communication from one or more infrastructure transceivers built into a road or transportation infrastructure.

10. A system, comprising:
a vehicle comprising a plurality of vehicle sensors;
a vehicle controller in electronic communication with the plurality of vehicle sensors, the vehicle controller comprising one or more processors configured to execute instructions stored in non-transitory computer readable storage medium, the instructions comprising:
retrieving drive history data for the vehicle from a high definition map comprising location information for roads, lane markings, and traffic signs in terms of global positioning system (GPS) coordinates, and further comprises behavioral features from previous trips travelled by the vehicle;
receiving supplemental data via one or more of a vehicle-to-vehicle communication or a vehicle-to-infrastructure communication; and
determining that light detection and ranging (LIDAR) sensor data received from a LIDAR system of the vehicle has dropped below a threshold quality based on weather conditions; and
in response to the LIDAR sensor data dropping below the threshold quality, localizing the vehicle relative to the high definition map based on the drive history data GPS data received from a GPS system of the vehicle, radar sensor data received from a radar perception sensor of the vehicle, and the supplemental data.

11. The system of claim 10, further comprising a transceiver in electronic communication with the vehicle controller that is configured for wirelessly receiving the one or more of the vehicle-to-vehicle communication or the vehicle-to-infrastructure communication.

12. The system of claim 10, wherein the plurality of vehicle sensors comprises one or more of the LIDAR system, the radar perception sensor, the GPS system, or a camera.

13. The system of claim 10, wherein the instructions further comprise determining whether the LIDAR system is providing usable data or is damaged based on one or more of:
the current weather conditions, including one or more of precipitation on roadways, low visual contrast, high reflectivity, fog, or precipitation; or
determining the LIDAR system is not providing any data.

14. The system of claim 13, wherein the instructions further comprise:
in response to determining the LIDAR system is not providing usable data or is damaged, localizing the vehicle relative to the high definition map based on the GPS data, the radar sensor data, and the supplemental data; and
localizing the vehicle relative to the high definition map based at least in part on the LIDAR sensor data when the LIDAR system is providing usable data.

15. Non-transitory computer readable storage media storing instructions for execution by one or more processors, the instructions comprising:
retrieving drive history data for a vehicle from a high definition map comprising location information for roads, lane markings, and traffic signs in terms of global positioning system (GPS) coordinates, and further comprises behavioral features from previous trips travelled by the vehicle;
receiving supplemental data via one or more of a vehicle-to-vehicle communication or a vehicle-to-infrastructure communication;

determining that light detection and ranging (LIDAR) sensor data received from a LIDAR system of the vehicle has dropped below a threshold quality based on weather conditions; and in response to the LIDAR sensor data dropping below the threshold quality, localizing the vehicle relative to the high definition map based on the drive history data, GPS data received from a GPS system of the vehicle, radar sensor data received from a radar perception sensor of the vehicle, and the supplemental data.

16. The non-transitory computer readable storage media of claim 15, wherein the plurality of vehicle sensors comprises one or more of the LIDAR system, the radar perception sensor, the GPS system, or a camera.

17. The non-transitory computer readable storage media of claim 16, wherein the instructions further comprise determining whether the LIDAR system is providing usable data or is damaged based on one or more of:

the current weather conditions, including one or more of precipitation on roadways, low visual contrast, high reflectivity, fog, or precipitation; or determining the LIDAR system is not providing any data.

18. The non-transitory computer readable storage media of claim 17, wherein the instructions further comprise:

in response to determining the LIDAR system is not providing usable data or is damaged, localizing the vehicle relative to the high definition map based on the GPS data, the radar sensor data, and the supplemental data; and localizing the vehicle relative to the high definition map based at least in part on the LIDAR sensor data when the LIDAR system is providing usable data.

19. The non-transitory computer readable storage media of claim 15, wherein the supplemental data comprises:

satellite positioning data from a satellite positioning system;

the information received via the vehicle-to-vehicle communication;

the information received via the vehicle-to-infrastructure communication; and information received from previous routes and trips driven by the vehicle.

20. The non-transitory computer readable storage media of claim 15, wherein the drive history data stored in the high definition map comprises the location information for previous trips driven by the vehicle and previous trips driving by other vehicles.

* * * * *